United States Patent
Gabriel et al.

(10) Patent No.: US 10,594,164 B2
(45) Date of Patent: Mar. 17, 2020

(54) RADIO FREQUENCY INTERFACE DEVICE

(71) Applicant: 3M INNOVATIVE PROPERTIES COMPANY, St. Paul, MN (US)

(72) Inventors: Nicholas T. Gabriel, Woodbury, MN (US); Andrew P. Bonifas, Alberta (CA); Brock A. Hable, Woodbury, MN (US); Ronald D. Jesme, Plymouth, MN (US); Nicholas G. Amell, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/576,093

(22) PCT Filed: May 11, 2016

(86) PCT No.: PCT/US2016/031816
§ 371 (c)(1),
(2) Date: Nov. 21, 2017

(87) PCT Pub. No.: WO2016/195939
PCT Pub. Date: Dec. 8, 2016

(65) Prior Publication Data
US 2018/0351412 A1 Dec. 6, 2018

Related U.S. Application Data (60) Provisional application No. 62/168,390, filed on May 29, 2015.

(51) Int. Cl.
*H04B 5/00* (2006.01)
*H02J 50/20* (2016.01)
(Continued)

(52) U.S. Cl.
CPC .............. *H02J 50/20* (2016.02); *H02J 50/50* (2016.02); *H02J 50/80* (2016.02); *H04B 5/0031* (2013.01);
(Continued)

(58) Field of Classification Search
CPC .. H04B 5/0037; H04B 5/0056; H04B 5/0031; H04B 5/02; H02J 50/20; H02J 50/50; H02J 50/80
See application file for complete search history.

(56) References Cited

U.S. PATENT DOCUMENTS

| 7,456,744 B2 | 11/2008 | Kuhns |
| 8,260,948 B2 * | 9/2012 | Chand ................... G06Q 30/06 340/10.1 |

(Continued)

FOREIGN PATENT DOCUMENTS

EP    2677773    12/2013

OTHER PUBLICATIONS

US 8,843,060 B2, 09/2014, Lele (withdrawn)
(Continued)

*Primary Examiner* — Tuan Pham
(74) *Attorney, Agent, or Firm* — Christopher D. Karlen (57) ABSTRACT

At least some aspects of the present disclosure feature an RF interface device. The RF interface device comprises an RF receiver, a wireless reader and an output component. The RF receiver is configured to receive power wirelessly. The wireless reader is configured to interrogate a wireless device. The wireless reader is further configured to provide power to the wireless device.

14 Claims, 3 Drawing Sheets

(51) Int. Cl.
  *H02J 50/80* (2016.01)
  *H02J 50/50* (2016.01)
  *H02J 50/10* (2016.01)
(52) U.S. Cl.
  CPC ......... *H04B 5/0037* (2013.01); *H04B 5/0056* (2013.01); *H02J 50/10* (2016.02); *H04B 5/0075* (2013.01)

(56) References Cited

U.S. PATENT DOCUMENTS

| | | | | |
|---|---|---|---|---|
| 2006/0229113 | A1* | 10/2006 | Rowse | H04B 5/0056 455/574 |
| 2008/0018467 | A1* | 1/2008 | Estevez | G06K 19/0707 340/572.1 |
| 2009/0067198 | A1 | 3/2009 | Graham | |
| 2009/0325484 | A1 | 12/2009 | Lele | |
| 2010/0190436 | A1 | 7/2010 | Cook | |
| 2013/0029685 | A1* | 1/2013 | Moshfeghi | G01S 19/48 455/456.1 |
| 2013/0152678 | A1* | 6/2013 | Hayashi | H04M 1/72575 73/431 |
| 2013/0344804 | A1 | 12/2013 | Chen | |
| 2014/0229246 | A1 | 8/2014 | Ghaffari | |
| 2014/0266025 | A1 | 9/2014 | Jakubowski | |
| 2014/0287681 | A1* | 9/2014 | Ollikainen | H02J 17/00 455/41.1 |
| 2014/0295754 | A1 | 10/2014 | Lortz | |
| 2018/0049257 | A1* | 2/2018 | Liu | H04B 5/02 |

OTHER PUBLICATIONS

NXP Semiconductors NV, "NFC TagInfo by NXP", [retrieved from the internet on Jan. 19, 2018], URL <www.NXP.com>, pp. 1-3.

STMicroelectronics, "ANT1-M24LR16E", Antenna Reference Board for the M24LR16E-R Dual Interface EEPROM [retrieved from the internet on Jan. 19, 2018], URL <http://www.st.com/st-web-ui/static/active/en/resource/technical/document/data_brief/DM00039288.pdf>, pp. 1-4.

STMicroelectronics, "ANT7-M24LR16E", Double Layer Antenna Reference Board for the M24LR16E-R Dual Interface EEPROM [retrieved from the internet on Jan. 19, 2018], URL <http://www.st.com/st-web-ui/static/active/en/resource/technical/document/data_brief/DM00039312.pdf>, pp. 1-4.

International Search Report for PCT International Application No. PCT/US2016/031816, dated Nov. 28, 2016, 6 pages.

\* cited by examiner

RADIO FREQUENCY INTERFACE DEVICE

CROSS REFERENCE TO RELATED APPLICATIONS

This application is a national stage filing under 35 U.S.C. 371 of PCT/US2016/031816, filed May 11, 2016 which claims benefit of Provisional Application No. 62/168,390, filed May 29, 2015, the disclosure of which is incorporated by reference in its/their entirety herein.

TECHNICAL FIELD

The present disclosure relates to interface devices that can be used between radio frequency (RF) readers and wireless devices that operate with different communication protocols, frequencies, or interfaces.

SUMMARY

At least some aspects of the present disclosure feature an RF interface device. The RF interface device comprises an RF receiver, a wireless reader and an output component. The RF receiver is configured to receive power wirelessly. The wireless reader is configured to interrogate a wireless sensor. The wireless reader is further configured to provide power to the wireless sensor and receive a sensor signal from the wireless sensor. The RF receiver is electrically coupled to the wireless reader and configured to generate an output signal based on the received sensor signal. The RF receiver supplies power to the wireless reader.

At least some aspects of the present disclosure feature a system comprising a wireless device and a passive RF interface device. The RF interface device includes an RF transceiver and a wireless reader. The wireless reader is configured to interrogate the wireless device. The wireless reader is further configured to provide power to the wireless device.

At least some aspects of the present disclosure feature a system comprising an RF reader and an RF interface device. The RF interface device includes an RF transceiver and a wireless reader. The RF transceiver is configured to receive power wirelessly from the RF reader. The wireless reader is configured to interrogate a wireless device and further configured to provide power to the wireless device.

BRIEF DESCRIPTION OF DRAWINGS

The accompanying drawings are incorporated in and constitute a part of this specification and, together with the description, explain the advantages and principles of the invention. In the drawings.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "The" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled to" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled to," or "directly in contact with" another element, there are no intervening elements, components or layers for example. As used herein, "powered" means a device receiving operational power.

Some aspects of the present disclosure are directed to a radio frequency (RF) interface device, which may receive power via the RF interface. As used herein, RF is used to refer to a broad class of wireless communication interfaces that can provide communication and power, including far field communication and near field communication, which may utilize a specific communication protocol. Near field communication includes, but is not limited to, near field communication using the set of standard protocols defined by the NFC Forum industry association (NFC). In some embodiments, the RF interface device is designed to interface between an RF reader and a wireless device, where the wireless device does not operate with the specific communication protocol of the RF reader. For example, the wireless device is an analog device. In such embodiments, the RF interface device initiates a communication with the wireless device when the interface device is interrogated by the RF reader or when the interface device is provided power by the RF reader, and the wireless device generates an output in response to the communication, for example, generating a sensing signal. In some cases, the wireless device is an analog device. In such cases, the sensing signal may be communicated without any digital modulation or digital coding. In some cases, the wireless device is a passive device and receives operational power wirelessly from the RF interface device.

More and more mobile devices have integrated NFC readers. The RF interface device, in various configurations, allow these mobile devices to gather data from non-NFC-compliant sensors or devices. Additionally, the RF interface device may provide power to these non-NFC-compliant sensors or devices wirelessly, such that these non-NFC-compliant sensors or devices do not need batteries or other power source.

Figure 1:
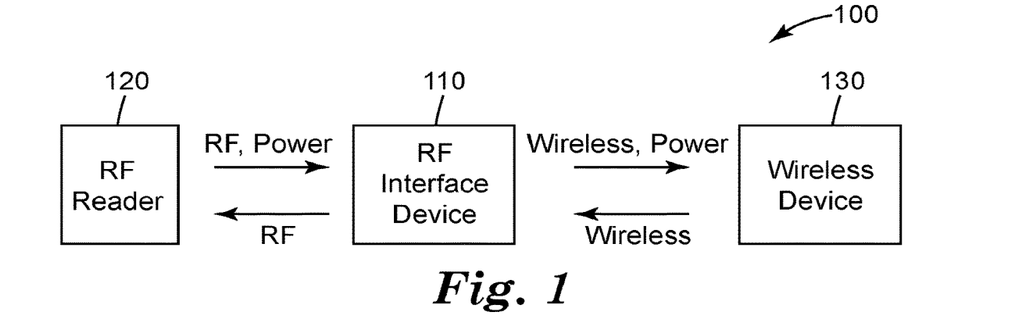
FIG. 1 illustrates a block diagram of one example of a communication system using an RF interface device.

FIG. 1 illustrates a block diagram of one example of a communication system 100 using an RF interface device 110. The communication system includes an RF reader 120, the RF interface device 110, and a wireless device 130. In some cases, both the RF interface device 110 and the wireless device 130 are passive devices. As used herein, a passive device refers to a device that does not have its own power source and acquires power from another device or source. In some cases, both the RF interface device 110 and the wireless device 130 receive power wirelessly. Power, as used herein, refers to operational power enabling the operation of the device. In the example illustrated in FIG. 1, the RF reader 120 interrogates the RF interface device 110 and provides power to the RF interface device 110 wirelessly. In response to the reader's interrogation, the RF interface device 110 may interrogate the wireless device 130 and further provide power to the wireless device 130 wirelessly. The wireless device can generate a device signal and transmit the device signal via the wireless link to the RF interface device. For an analog wireless device, the device signal may be a modification to the received wireless signal from the RF interface device 110, which can indicate the present state of the device. The device signal may be modified without any digital modulation or digital coding. The RF interface device 110 may generate an interface output signal based on the received device signal. In some cases, the RF interface device 110 may output the interface output signal via an output device, for example, a sound source or light source. In some other cases, the RF interface device 100 may transmit the interface output signal to the RF reader 120 via the RF link, for example, using the specific RF protocol that the RF reader 120 uses.

Figure 2:
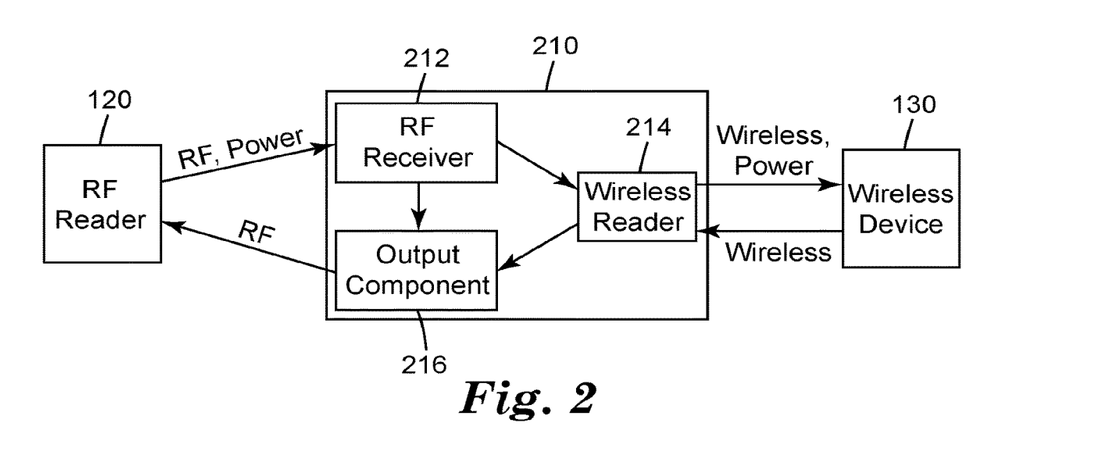
FIG. 2 illustrates a conceptual diagram of one example of an RF interface device.

FIG. 2 illustrates a conceptual diagram of one example of an RF interface device 210. In this diagram, the RF interface device 210 can be used with the RF reader 120 and the wireless device 130 similar to the system illustrated in FIG. 1. The RF interface device 210 includes an RF receiver 212, a wireless reader 214, and an output component 216. In some cases, the RF receiver is configured to receive power wirelessly, for example, from the RF reader 120 via the RF link. The wireless reader 214 is configured to interrogate the wireless device 130, in some cases, in response to a command received from the RF reader 120. In some cases, the wireless reader 214 is further configured to provide power to the wireless device 130 and receive a device signal from the wireless device 130. The output component 216 is electrically coupled to the wireless reader 214 and configured to generate an output signal based on the received device signal. In some embodiments, the RF receiver 212 supplies power to the wireless reader 214 and/or the output component 216.

In some embodiments, the wireless device 130 includes one or more sensing elements. In such embodiments, the wireless reader 214 can provide power to the one or more sensing elements. These sensing elements are not capable of communicating with an RF communication protocol, also referred to as non-RF-compliant. These non-RF-compliant sensing elements may be low cost sensing elements. As an example, RLC resonance circuits are used for sensing temperature, pressure, moisture, and loss mechanisms or engineered controllable properties within the resonant circuit. Some examples of multiple sensing elements interrogated by a wireless reader are described in U.S. Pat. No. 7,456,744, entitled "Systems and Methods for Remote Sensing Using Inductively Coupled Transducers," which are incorporated herein by reference in entirety. In some cases, the wireless device 130 includes a radio frequency identification (RFID) tag.

In some embodiments, the wireless device 130 includes one or more analog devices, such that the device signal is an analog signal. In some cases, the wireless reader 214 is further configured to convert the received analog device signal to a digital signal. In some embodiments, the output component 216 comprises an RF transmitter. In such embodiments, the wireless reader 214 and/or the output component 216 compose the output signal in compliance with the RF protocol used by the RF reader, then the output component 216 sends the output signal to the RF reader 120. In some cases, the RF receiver 212 and the output component 216 are an integrated component.

In some embodiments, the RF receiver 212 includes a first antenna for RF communication. In some cases, the wireless reader 214 includes a second antenna for wireless communication with the wireless device 130. In some cases, the first antenna and the second antenna are a same antenna. In some embodiments, the RF receiver 212 is further configured to receive a command from the RF reader 120. In some cases, the wireless reader 214 is configured to initiate an interrogation to the wireless device 130 in response to the command received from the RF reader 120. In some cases, the RF receiver 212 is electrically coupled to the wireless reader 214. In some cases, the received command includes information related to the wireless device, for example, communication protocol supported, security passwords or keys required, unique identification number, power requirements or limits, calibration data, information to be written to the device (e.g., a timestamp, calibration values, final result based on information provided by the wireless device etc.), configuration of output signal (frequency, amplitude, sweep rate, etc.), measurement mode (minimum, maximum, impedance, peak detection, resonance frequency, resonance bandwidth or quality factor, etc.), number of devices or sensors, or the like. In some cases, the RF receiver 212 is further configured to provide the received command to the wireless reader 214. In some cases, the wireless reader 214 is configured to change an operation mode in response to the received command. The operation mode includes, for example, a communication protocol, reader frequency, reader modulation (at least one of amplitude, frequency and phase), reader circuit configuration, reader signal processing algorithm, and output mode.

Figure 3:
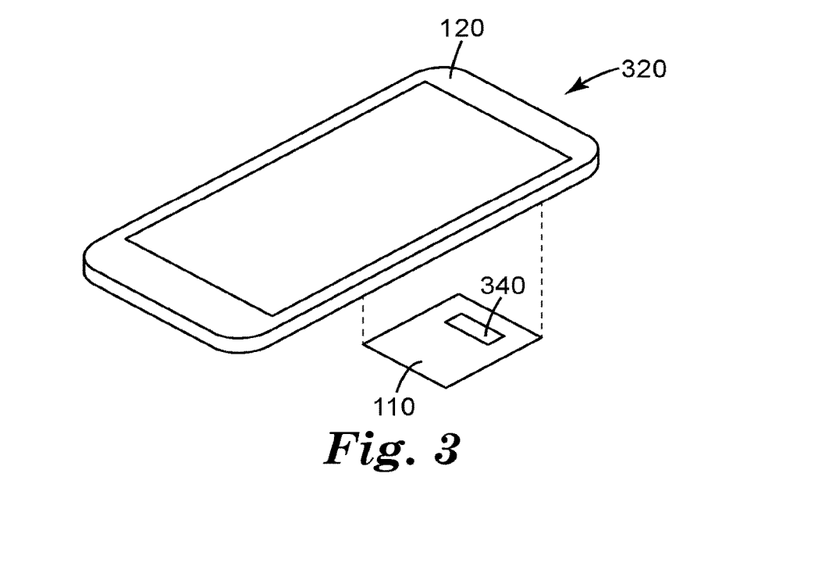
FIG. 3 illustrates a conceptual diagram of a mobile device attached to or integrated with the RF interface device.

FIG. 3 illustrates a conceptual diagram of a mobile device 320 attached to or integrated with the RF interface device 110. In some cases, the RF reader 120 is integrated with the mobile device 320. In some cases, the RF interface device 110 is attached to the mobile device 320 via an attachment device 340. The attachment device may include, for example, an adhesive, a fastener, a cover attachment, or the like.

Figure 4:
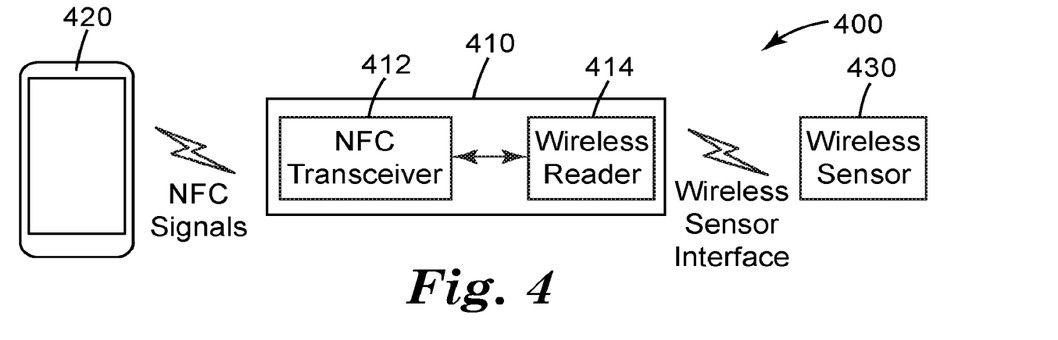
FIG. 4 illustrates an example of a system using an NFC interface device.

FIG. 4 illustrates an example of a system 400 using an NFC interface device 410. The system 400 includes an NFC-enabled mobile device 420, the NFC interface device 410, and a wireless sensor 430. The NFC-enabled mobile device 420 has an NFC reader (not shown) integrated thereon. The NFC interface device 410 includes an NFC transceiver 412 and a wireless reader 414 electrically coupled to the NFC transceiver 412. In some embodiments, the NFC interface device 410 is a passive device that does not include a power source. In such embodiments, the NFC transceiver 412 receives power wirelessly when the NFC reader interrogates. In some cases, the NFC transceiver 412 can receive and transmit signals using an NFC protocol. After the NFC transceiver 412 receives power and/or data via the NFC interface, the NFC transceiver 412 will supply power to the wireless reader 414, which in turn provides a portion of the received power to the wireless sensor 430 via the wireless interface. In some cases, the NFC transceiver 412 is a transponder that may communicate by responding to interrogation by the NFC reader in the NFC-enabled mobile device 420.

In some embodiments, the wireless sensor 430 may be activated by the wireless power, generate and optionally transmit sensor signals. In some cases, the wireless sensor 430 includes an output component (not shown in FIG. 4) to provide an indication of sensor signals, for example, an LED (light-emitting diode) indicator, a vibration indicator, or the like. The wireless sensor 430 can include, for example, one or more environmental condition sensors, a biological function and/or condition sensors, stress or strain sensors, thermal property sensors, displacement sensors, material property sensors, electrical property sensors, or the like. In some embodiments, the NFC interface device may include an energy harvesting component that can receive power via other sources besides NFC interface, for example, an optical source, a vibration source, a temperature gradient source, or the like.

In some embodiments, the NFC interface device 410 and/or the wireless sensor 430 includes an energy storage device. The energy storage device can includes, for example, a relatively large capacitor, a small rechargeable storage device, or the like. The energy storage device can provide power to the respective device when the received wireless power is temporarily insufficient or in fluctuation. In some embodiments, the energy storage device can provide no more than 10% of the energy consumed by one complete interrogation and response cycle of the NFC interface device 410. In some cases, the energy storage device can provide no more than 50% or 90% of the energy consumed by the NFC interface device 410. In some cases, the energy storage device can provide power for no more than 1 second. In some cases, the energy storage device can provide power for no more than 10 seconds. In some embodiments, the energy storage device of the NFC interface device 410 receives power from the NFC transceiver 412.

In some embodiments of the wireless sensor 430 transmitting sensor signals to the wireless reader 414, the NFC transceiver 412 is configured to transmit NFC signals based on the received sensor signals. In some cases of receiving analog sensor signals, the NFC transceiver 412 or the wireless reader 414 is configured to convert the analog sensor signals to digital signals and compose NFC signals using the NFC reader specific protocol.

In some embodiments, the wireless sensor 430 includes one or more sensing elements. In some cases, part or all of the one or more sensing elements are implanted into a body. In some implementations, the NFC interface device 410 can be disposed proximate to the body. In some implementations, the NFC interface device 410 can be attached to the skin. For example, the NFC interface device 410 can be part of a dressing or a garment.

Figure 5A:
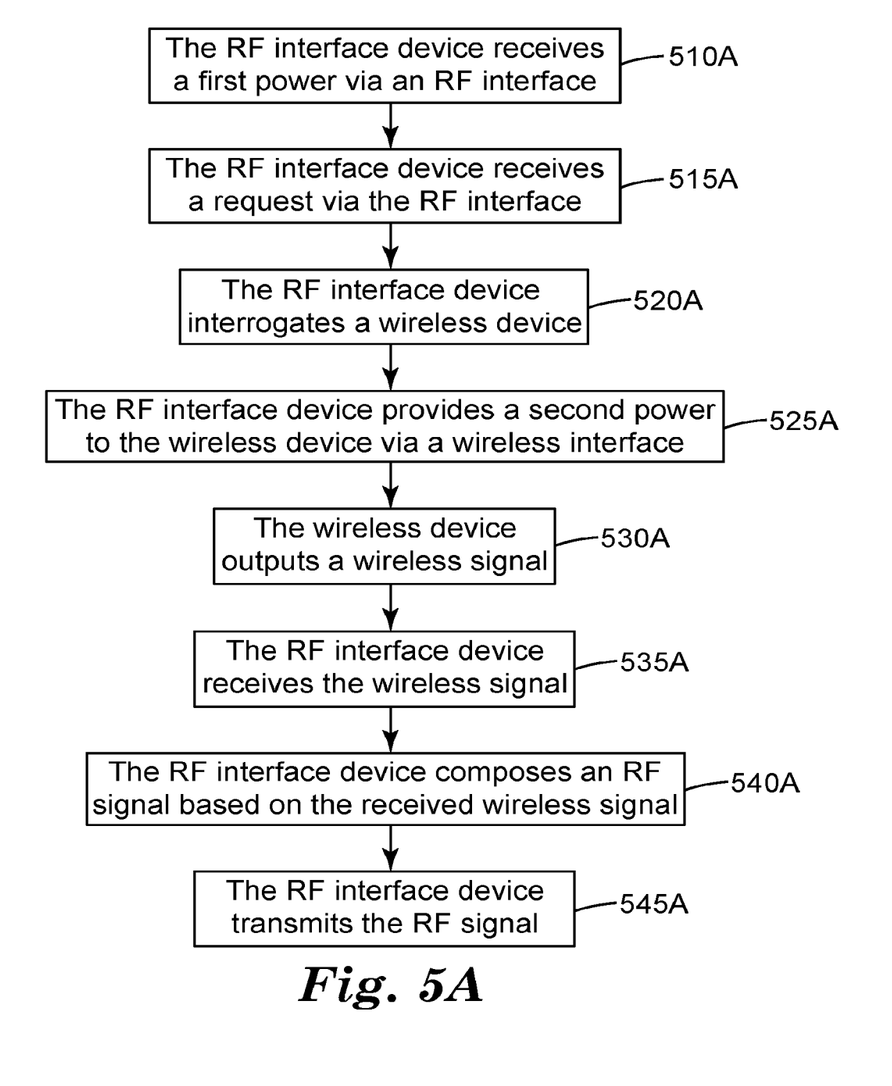
FIG. 5A illustrates one example of a flow diagram of a system using an RF interface device.

FIG. 5A illustrates one example of a flow diagram of a system using an RF interface device, where one or more steps are optional and the order of some steps can change. The RF interface device can use any one of the configurations of interface device described herein. Initially, the RF interface device receives a first power via an RF interface (510A). The RF interface device receives a request via the RF interface (515A). The RF interface device interrogates a wireless device (520A). In some cases, the RF interface device interrogates the wireless device in response to the request received. In some cases, the RF interface device adjusts its operational mode based on the request received, for example, the communication protocol, the wireless reader frequency, reader modulation (at least one of amplitude, frequency, and phase), reader circuit configuration, reader signal processing algorithm, output mode, or the like. The RF interface device provides a second power to the wireless device via a wireless interface (525A). In some cases, the second power is a portion of the first power. The wireless device outputs a wireless signal (530A). The RF interface device receives the wireless signal (535A). In some cases, the RF interface device generates an output signal based on the received wireless signal. In some cases, the RF interface device composes an RF signal based on the received wireless signal (540A). The RF interface device transmits the RF signal (545A).

Figure 5B:
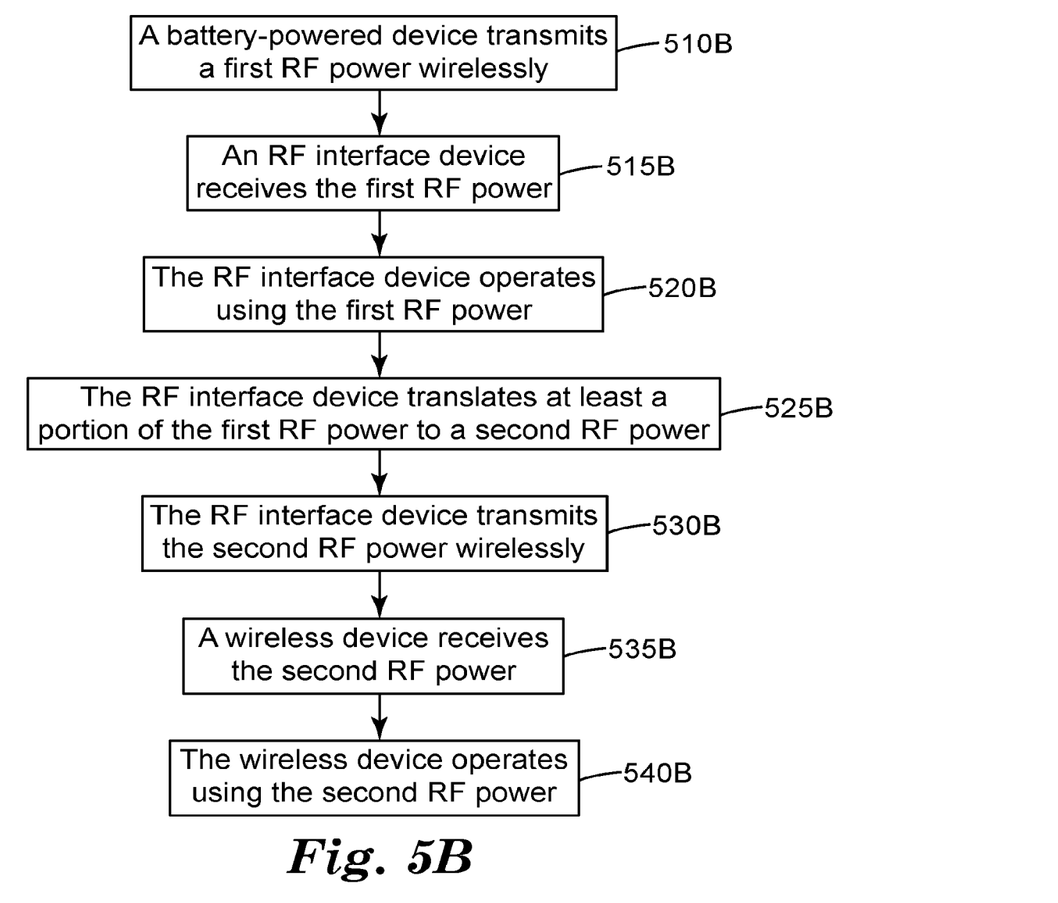
FIG. 5B illustrates a flow chart of one example of how power is transferred and used with an RF interface device.

FIG. 5B illustrates a flow chart of one example of how power is transferred and used with an RF interface device, where one or more steps are optional. A battery-powered device transmits a first RF power wirelessly (510B). An RF interface device receives the first RF power (515B). The RF interface device operates using the first RF power (520B). The RF interface device translates at least a portion of the first RF power to a second RF power (525B). The RF interface device transmits the second RF power wirelessly (530B). A wireless device receives the second RF power (535B). The wireless device operates using the second RF power (540B).

EXAMPLES

Example 1

NFC Reader to Non-NFC Wireless Device Communication

Referring back to FIG. 4, communication was established with an NFC interface device 410 configured to interrogate a wireless sensor 430. A Samsung Galaxy S5 smartphone obtained from Samsung of Seoul, South Korea was selected as the NFC-enabled mobile device 420. An "NFC TagInfo by NXP" application developed by NXP Semiconductors N.V. of Eindhoven, Netherlands and acquired from the Google Play store (Google, Inc. of Mountain View, Calif., United States) was installed on the smartphone. The NFC interface device 410 was assembled from an ANTI-M24LR16E antenna reference board obtained from STMicroelectronics of Geneva, Switzerland comprising an NFC transceiver 412, and a custom wireless reader 414 circuit, designed by 3M Company, with a digital input/output port to interface with the antenna reference board and a wireless sensor interface to communicate with a wireless sensor 430.

Upon activation of the "NFC TagInfo by NXP" application running on the Samsung Galaxy S5 smartphone and placement of the smartphone in proximity to the NFC interface device 410, the smartphone transmitted power and data to the NFC interface device 410. The voltage generated by the NFC transceiver 412 powering the wireless reader 414 of the NFC interface device 410 was measured to be 2.4 volts by a digital multimeter as the wireless reader 414 was operating its wireless sensor interface, as confirmed by activation of a status LED on the wireless reader 414. The 8 milliamperes of operational power for the wireless reader 414 at 2.4 volts means approximately 19.2 milliwatts of operational power was transferred from the smartphone through the NFC interface device 410 wireless sensor interface. The memory contents of the NFC interface device 410 were obtained by the smartphone and displayed in the application.

Exemplary Embodiments

Item A1. An RF interface device, comprising:
an RF receiver configured to receive power wirelessly,
a wireless reader configured to interrogate a wireless sensor, the wireless reader further configured to provide power to the wireless sensor and receive a sensor signal from the wireless sensor, and
an output component electrically coupled to the wireless reader and configured to generate an output signal based on the received sensor signal,
wherein the RF receiver supplies power to the wireless reader.

Item A2. The RF interface device of Item A1, wherein the sensor signal is an analog sensor Item A3. The RF interface device of Item A2, wherein the wireless reader is further configured to convert the received analog sensor signal to a digital signal.

Item A4. The RF interface device of any one of Item A1-A3, wherein the output component comprises an RF transmitter.

Item A5. The RF interface device of Item A4, wherein the RF receiver and the RF transmitter is an integrated component.

Item A6. The RF interface device of any one of Item A1-A5, wherein the RF receiver includes a first antenna for RF communication.

Item A7. The RF interface device of Item A6, wherein the wireless reader includes a second antenna for wireless communication to the wireless sensor.

Item A8. The RF interface device of Item A7, wherein the first antenna and the second antenna are a same antenna.

Item A9. The RF interface device of any one of Item A1-A8, wherein the RF receiver is configured to receive power wirelessly via an RF reader.

Item A10. The RF interface device of Item A9, wherein the RF receiver is further configured to receive a command from the RF reader.

Item A11. The RF interface device of Item A10, wherein the wireless reader is configured to initiate an interrogation to the wireless sensor in response to the command received from the RF reader.

Item A12. The RF interface device of Item A10, wherein the RF receiver is electrically coupled to the wireless reader.

Item A13. The RF interface device of Item A12, wherein the RF receiver is further configured to provide the received command to the wireless reader.

Item A14. The RF interface device of Item A13, wherein the wireless reader is configured to change an operation mode in response to the received command.

Item A15. The RF interface device of Item A14, wherein the operation mode comprises at least one of a communication protocol, reader frequency, reader modulation, reader circuit configuration, reader signal processing algorithm, and output mode.

Item A16. The RF interface device of Item A9, wherein the RF reader is integrated with a mobile device.

Item A17. The RF interface device of Item A16, wherein the RF interface device is attached to or integrated with the mobile device.

Item A18. The RF interface device of Item A17, wherein the RF interface device is attached to the mobile device via an attachment device.

Item A19. The RF interface device of Item A18, wherein the attachment device comprises at least one of an adhesive, a fastener, and a cover attachment.

Item B1. A system, comprising:
a wireless device, and
a passive RF interface device, comprising:
an RF transceiver, and
a wireless reader configured to interrogate the wireless device, the wireless reader further configured to provide power to the wireless device.

Item B2. The system of Item B1, wherein the wireless device comprises a wireless sensor.

Item B3. The system of Item B2, wherein the wireless device comprises an analog wireless sensor.

Item B4. The system of any one of Item B1-B3, wherein the wireless reader is further configured to receive a wireless signal from the wireless device.

Item B5. The system of any one of Item B1-B4, further comprising: an RF reader.

Item B6. The system of Item B5, wherein the RF transceiver is configured to receive power wirelessly from the RF reader.

Item B7. The system of any one of Item B1-B6, wherein the RF interface device comprises an energy harvesting component.

Item B8. The system of Item B4, wherein the RF transceiver is electrically coupled to the wireless reader and configured to transmit a signal indicative of the received wireless signal.

Item B9. The system of any one of Item B1-B8, wherein the wireless device is a passive device.

Item B10. The system of any one of Item B1-B9, wherein the wireless device comprises a plurality of sensing elements.

Item B11. The system of Item B9, wherein the RF interface device is configured to provide power to the plurality of sensing elements.

Item B12. The system of any one of Item B1-B11, wherein the RF transceiver includes a first antenna for RF communication.

Item B13. The system of Item B12, wherein the wireless reader includes a second antenna for wireless communication to the wireless sensor.

Item B14. The system of Item B13, wherein the first antenna and the second antenna are a same antenna.

Item B15. The system of Item B5, wherein the RF transceiver is further configured to receive a command from the RF reader.

Item B16. The system of Item B15, wherein the wireless reader is configured to initiate an interrogation to the wireless sensor in response to the command received from the RF reader.

Item B17. The system of Item B1, wherein the RF transceiver is electrically coupled to the wireless reader.

Item B18. The system of Item B17, wherein the RF transceiver is further configured to provide the received command to the wireless reader.

Item B19. The system of Item B18, wherein the wireless reader is configured to change an operation mode in response to the received command.

Item B20. The system of Item B19, wherein the operation mode comprises at least one of a communication protocol, reader frequency, reader modulation, reader circuit configuration, reader signal processing algorithm, and output mode.

Item B21. The system of Item B5, wherein the RF reader is integrated with a mobile device.

Item B22. The system of Item B21, wherein the RF interface device is attached to or integrated with the mobile device.

Item B23. The system of Item B22, wherein the RF interface device is attached to the mobile device via an attachment device.

Item B24. The system of Item B23, wherein the attachment device comprises at least one of an adhesive, a fastener, and a cover attachment.

Item C1. A system, comprising:
an RF reader, and
an RF interface device, comprising:
  an RF transceiver configured to receive power wirelessly from the RF reader, and
  a wireless reader configured to interrogate a wireless device, the wireless reader further configured to provide power to the wireless device.

Item C2. The system of Item C1, wherein the wireless device comprises a wireless sensor.

Item C3. The system of Item C2, wherein the wireless device comprises an analog wireless sensor.

Item C4. The system of any one of Item C1-C3, wherein the wireless reader is further configured to receive a wireless signal from the wireless device.

Item C5. The system of Item C4, wherein the RF transceiver is electrically coupled to the wireless reader and configured to transmit a signal indicative of the received wireless signal.

Item C6. The system of any one of Item C1-C5, wherein the RF reader is integrated with a mobile device.

Item C7. The system of Item C6, wherein the RF interface device is attached to or integrated with the mobile device.

Item C8. The system of any one of Item C1-C5, wherein the RF transceiver includes a first antenna for RF communication.

Item C9. The system of Item C8, wherein the wireless reader includes a second antenna for wireless communication to the wireless sensor.

Item C10. The system of Item C9, wherein the first antenna and the second antenna are a same antenna.

Item C11. The system of any one of Item C1-C10, wherein the RF transceiver is further configured to receive a command from the RF reader.

Item C12. The system of Item C11, wherein the wireless reader is configured to initiate an interrogation to the wireless sensor in response to the command received from the RF reader.

Item C13. The system of Item C11, wherein the RF transceiver is electrically coupled to the wireless reader.

Item C14. The system of Item C12, wherein the RF transceiver is further configured to provide the received command to the wireless reader.

Item C15. The system of Item C13, wherein the wireless reader is configured to change an operation mode in response to the received command.

Item C16. The system of Item C14, wherein the operation mode comprises at least one of a communication protocol, reader frequency, reader modulation, reader circuit configuration, reader signal processing algorithm, and output mode.

Item C17. The system of Item C1, wherein the RF reader is integrated with a mobile device.

Item C18. The system of Item C17, wherein the RF interface device is attached to or integrated with the mobile device.

Item C19. The system of Item C18, wherein the RF interface device is attached to the mobile device via an attachment device.

Item C20. The system of Item C19, wherein the attachment device comprises at least one of an adhesive, a fastener, and a cover attachment.

Item D1. A method, comprising:
receiving a first power by an RF interface device via an RF interface;
interrogating a wireless device by the RF interface device;
providing a second power to the wireless device by the RF interface device via a wireless interface; and
outputting a wireless signal by the wireless device.

Item D2. The method of Item D1, further comprising:
receiving, by the RF interface device, the wireless signal from the wireless device.

Item D3. The method of Item D2, further comprising:
transmitting, by the RF interface device, a signal indicative of the received wireless signal.

Item D4. The method of any one of Item D1-D3, further comprising:
receiving, by the RF interface device, a request via the RF interface,
wherein the interrogating step comprises the RF interface device interrogating the wireless device in response to the received request.

Item D5. The method of Item D2, further comprising:
composing an RF signal based on the received wireless signal by the RF interface device; and
transmitting the RF signal by the RF interface device.

Item D6. The method of Item D2, further comprising:
generating an output signal based on the received wireless signal by the RF interface device.

Item D7. The method of any one of Item D2, wherein the wireless signal is an analog wireless signal.

Item D8. The method of Item D7, further comprising:
converting the received analog wireless signal to a digital signal by the RF interface device.

Item D9. The method of Item D4, further comprising:
changing an operation mode in response to the received request.

Item D10. The method of Item D9, wherein the operation mode comprises at least one of a communication protocol, reader frequency, reader modulation, reader circuit configuration, reader signal processing algorithm, and output mode.

What is claimed is:

1. An RF interface device to be used with a mobile device having an RF reader, comprising:
    an RF receiver configured to receive power wirelessly from the RF reader,
    a wireless reader configured to interrogate a wireless sensor, the wireless reader further configured to provide power to the wireless sensor and receive a sensor signal from the wireless sensor,
    an output component electrically coupled to the wireless reader and configured to generate an output signal based on the received sensor signal and send the output signal to the RF reader, and an attachment device, wherein the RF receiver supplies power to the wireless reader, wherein the wireless sensor is a non-RF-compliant sensor, wherein the RF interface device is configured to be attached to the mobile device via the attachment device.

2. The RF interface device of claim 1, wherein the sensor signal is an analog sensor signal.

3. The RF interface device of claim 2, wherein the wireless reader is further configured to convert the received analog sensor signal to a digital signal.

4. The RF interface device of claim 1, wherein the attachment device comprises an adhesive.

5. The RF interface device of claim 1, wherein the RF receiver is configured to receive power wirelessly via an RF reader.

6. The RF interface device of claim 5, wherein the RF receiver is further configured to receive a command from the RF reader.

7. The RF interface device of claim 6, wherein the wireless reader is configured to initiate an interrogation to the wireless sensor in response to the command received from the RF reader.

8. The RF interface device of claim 6, wherein the wireless reader is configured to change an operation mode in response to the received command.

9. A system to be used with a mobile device having an RF reader, comprising:

a wireless device, and a passive RF interface device, comprising:

an RF transceiver configured to receive power from the RF reader, an attachment device, and a wireless reader configured to interrogate the wireless device, the wireless reader further configured to provide power to the wireless device, wherein the wireless device is a non-RF-compliant device, wherein the passive RF interface device is configured to be attached to the mobile device via the attachment device, wherein the wireless reader is further configured to receive a wireless signal from the wireless device, and wherein the RF transceiver is electrically coupled to the wireless reader and configured to transmit a signal indicative of the received wireless signal to the RF reader.

10. The system of claim 9, wherein the attachment device comprises an adhesive.

11. The system of claim 9, wherein the wireless device comprises a plurality of sensing elements.

12. The system of claim 11, wherein the RF interface device is configured to provide power to the plurality of sensing elements.

13. A system, comprising:

an RF reader, and an RF interface device, comprising:

an RF transceiver configured to receive power wirelessly from the RF reader, an attachment device, and a wireless reader configured to interrogate a wireless device, the wireless reader further configured to provide power to the wireless device, wherein the wireless device is a non-RF-compliant device, wherein the RF interface device is attached to the RF reader via the attachment device, wherein the RF transceiver is electrically coupled to the wireless reader and configured to transmit a signal indicative of the received wireless signal to the RF reader.

14. The system of claim 13, wherein the attachment device comprises an adhesive.

* * * * *